No. 745,824. PATENTED DEC. 1, 1903.
W. U. GRIFFITHS.
APPARATUS FOR EXPELLING WATER FROM CELLARS.
APPLICATION FILED NOV. 21, 1902.
NO MODEL. 2 SHEETS—SHEET 1.
FIG. 1.
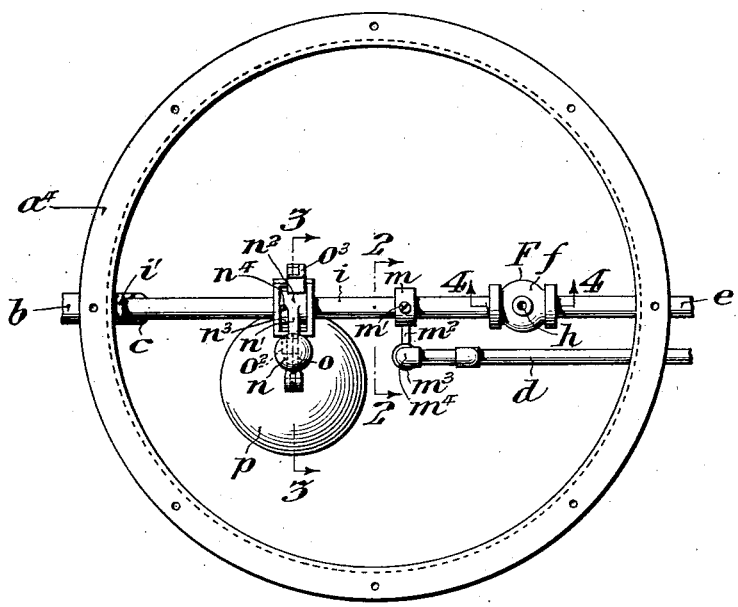
FIG. 2. FIG. 3. FIG. 4.
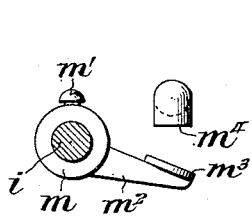 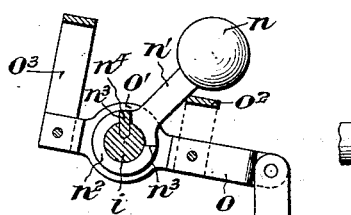 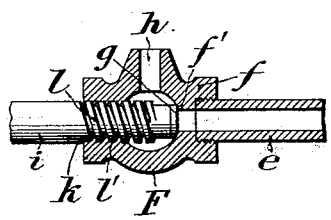
WITNESSES:
Arthur E. Page
Thos. K. Lancaster
William U. Griffiths
INVENTOR:
By his Attorney

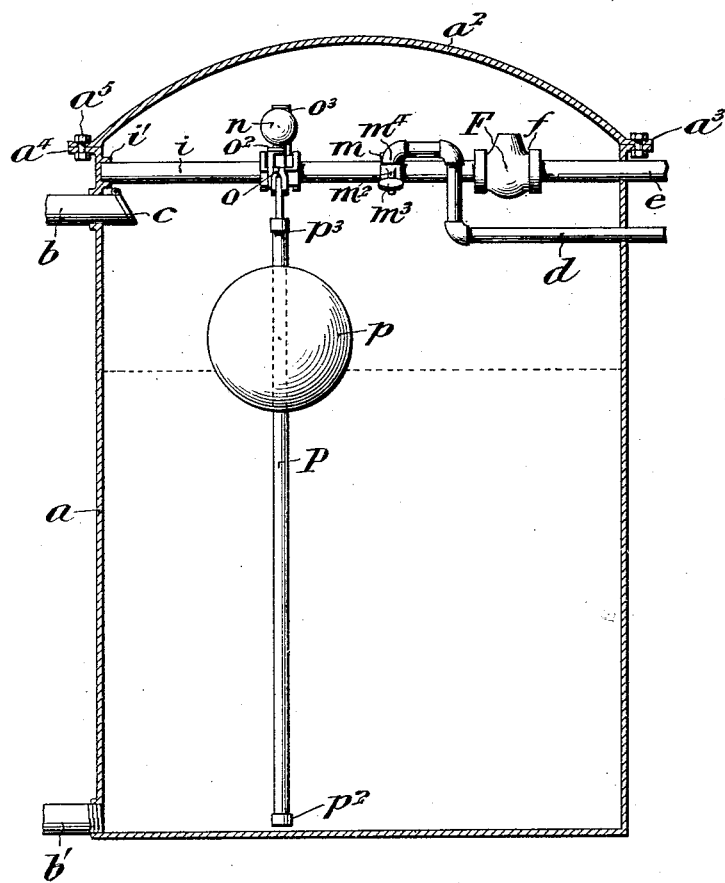

No. 745,824. Patented December 1, 1903.

UNITED STATES PATENT OFFICE.

WILLIAM U. GRIFFITHS, OF PHILADELPHIA, PENNSYLVANIA.

APPARATUS FOR EXPELLING WATER FROM CELLARS.

SPECIFICATION forming part of Letters Patent No. 745,824, dated December 1, 1903.

Application filed November 21, 1902. Serial No. 132,193. (No model.)

*To all whom it may concern:*

Be it known that I, WILLIAM U. GRIFFITHS, a citizen of the United States, residing in the city of Philadelphia, county of Philadelphia, State of Pennsylvania, have invented certain new and useful Improvements in Apparatus for Expelling Water from Cellars, &c., of which the following is a specification.

Broadly considered, this invention relates to apparatus for raising water from a lower to a higher level. Considered, however, in its more specific aspect, it relates to apparatus especially designed for expelling water from cellars, its object being to effect this function with greater facility and more effectually than has heretofore been done.

For a full and complete disclosure of this invention, reference is to be had to the drawings which accompanying this specification, and in which Figure 1 is a plan view of the tank, with the top or cover removed.

Figure 2 is a view along the line 2—2, showing the valve stem in section and the other parts in elevation.

Figure 3 is a view along the line 3—3 of Figure 1, showing the valve stem in section, and the operating mechanism therefor in elevation.

Figure 4 is a section of the valve mechanism along the line 4—4 of Figure 1.

Figure 5 is a vertical sectional view of the tank, the operating mechanism in the tank being shown in elevation.

In the drawings, $a$ designates the tank which is located beneath a cellar to receive the water which may flow outward and downward therefrom. The said tank is provided with a water-tight cover $a^2$, having a flange-like projection $a^3$ adapted to be seated upon a corresponding flange-like projection $a^4$ extending laterally from the upper edge of the said tank. The top is secured to the tank by means of the screws $a^5$ passing through registering holes in the flanges $a^3$ and $a^4$.

$b$ designates a pipe leading from the cellar to the tank, the said pipe being provided with a clack-valve $c$, as shown.

$b'$ is an exit pipe leading from the bottom of the tank to a sewer or other locality to which the water from the tank is to be conducted. The said pipe is provided with a suitable valve, not shown, for preventing the return of the water therefrom to the tank after it has been expelled or forced into said pipe.

$d$ designates a pipe supported in any desired manner, as, for instance, upon the walls of the tank, and which extends from the said tank outwardly to any desired locality or position, and is for the purpose of allowing the gas and air to escape from the tank as the latter is filled with water.

$e$ designates a pipe leading from some source of gas, for instance, steam, or air, under pressure, into the said tank. This pipe is provided with a valve mechanism F which consists of a body portion $f$ and a valve seat $f'$ against which a valve $g$ consisting of a plate or washer of any desired material is adapted to be seated.

The valve body $f$ is provided with an opening $h$ through which the gas under pressure passes directly into the tank, when the valve is opened. The valve is supported upon a stem $i$, the latter passing through an opening $k$ in the valve body $f$, by means of which one end of the stem is supported, the other end being supported within a circular opening formed in a boss $i'$ upon the wall of the tank. The boss $i'$ is secured to the walls of the tank in any suitable manner and is of sufficient depth or length to permit of slight longitudinal movement of the valve stem without effecting disengagement of the same from the boss.

The portion of the stem which is supported upon the valve body is provided with screw threads $l$ which are in engagement with corresponding depressions $l'$ provided in the opening $k$ of the valve body.

$m$ is a sleeve secured upon the valve stem by means of a set screw, $m'$, and is provided with an arm or extension $m^2$. Mounted upon the free end of said arm or extension is a flat plate $m^3$ of any desirable material, which is adapted to close the opening $m^4$ of the pipe $d$.

$n$ is a weight secured upon the free end of an arm $n'$ which extends from a sleeve $n^2$ loosely mounted upon the valve stem $i$.

The sleeve $n^2$ is provided with shoulders $n^3$ which are adapted to engage a lug or projection $n^4$ upon the valve stem $i$, for causing the rotation of said stem in opposite directions.

o is a lever provided with an enlargement o', having an opening therethrough, by means of which it is mounted upon the valve stem as clearly shown in Figure 3 of the drawings. This enlargement is also provided with a vertical opening or slot in which the arm $n'$ and sleeve $n^2$ are situated. The said lever is provided with trip arms $o^2$ and $o^3$, the said trips being located upon opposite sides of the pivot of the lever, as clearly shown in Figure 3.

The arm $n'$ is normally in engagement with the trip arm $o^2$ in which position the valve $g$ is closed.

P designates a rod or bar pivoted to one end of and extending downwardly from the lever $o$, the said bar being shown in its lowermost position in Figure 5.

$p$ is a float of any suitable construction and material, provided with a central opening $p'$ through which the bar P loosely passes. The float $p$ is adapted, as is obvious, to move upwardly and downwardly upon the said bar P, but is prevented from becoming disengaged from the said bar by means of an enlargement $p^2$ located at the lower end of said bar. The upward movement of the float is limited by a shoulder or enlargement $p^3$ on the said bar.

By the employment of the mechanism herein described, I utilize the entire expansive force of the gas employed in expelling the water from the tank.

The operation of the apparatus is as follows:

As the water flows into the tank from the cellar, the float gradually moves upwardly, as is indicated in Figure 5, from the lower end of the bar P whereby it is brought into contact with the shoulder $p^3$, after which further upward movement of the said float causes the lever $o$ to rotate upon its pivot. The trip arm $o^2$ which is located on the lever $o$ intermediate the bar P and the pivot of the said lever $o$, also rotates about the same axis as said lever and causes the rotation of the weight $n$ about the corresponding axis.

When the said weight has reached a point such that its center of gravity is to the left of said axis, reference being had to Figure 3, it will move to the left under the influence of its own weight independently of the lever $o$, and the right hand shoulder $n^3$ will engage the lug $n^4$ and cause the valve stem $i$ to rotate until the plate $m^3$ carried on the arm $m^2$ comes into contact with the open end of the pipe $d$, such contact serving the double function of closing the open end of said pipe and of limiting the rotative movements of the valve stem $i$ and of the weight $n$.

In consequence of the screw threaded connection between the valve stem and the valve body, the rotation of the said stem will cause it, and consequently the valve $g$ which is carried thereby, to be moved away from the valve seat $f'$, whereby the pipe leading from the source of gas supply will be opened. The closure of the pipe $d$, as above described, prevents the exit of the gas which enters the tank through the opening $h$ when the valve $g$ is open, the said valve being opened and the open end of the pipe $d$ being closed, as a result of the upward movement of the float $p$.

It is obvious that upon admission of gas under pressure, the valve $c$ will be closed by the action of the same, and the opening in the pipe $d$ also being closed, the water will be expelled from the said tank through the exit pipe $b'$.

As the water is expelled from the tank, the float moves downwardly until it comes into contact with the enlargement $p^2$ and its weight being exerted upon the bar P will cause a movement of the lever $o$, trip arms $o^2$ and $o^3$, the weight $n$, and the valve stem, in a direction opposite to that above stated whereby the valve will be closed, and the end of the pipe $d$ opened.

The operation is automatic and is controlled by the float $p$ which rises and falls with the rising and falling of the water in the tank.

It is evident that modifications of the mechanism disclosed in this application may be employed, without departing from the spirit and scope of my invention, and I wish it to be understood, therefore, that I do not desire to be restricted to the specific construction disclosed herein.

Having thus described my invention, I claim—

1. In combination, a water tank, a pipe leading thereinto for supplying air under pressure, a rotary valve stem provided with a valve for opening and closing said pipe, an exhaust pipe leading from said tank, and an arm rigidly secured to the said valve stem and carrying at its outer end a plate which is adapted to open and close the said exhaust pipe, substantially as described.

2. In combination, a water tank, a pipe leading thereinto for supplying air under pressure, a rotary valve stem provided with a valve for opening and closing said pipe, an exhaust pipe leading from said tank, and an arm mounted on the valve stem and provided with means which is adapted to open and close the said exhaust pipe, for the purpose set forth.

3. In combination, a water tank, an inlet pipe leading thereinto, an exit pipe for conveying the water therefrom, a pipe leading thereinto for supplying air under pressure, a rotary valve stem provided with a valve for opening and closing said pipe, an exhaust pipe leading from said tank, and an arm mounted on the valve stem and provided with a plate which is adapted to open and close the said exhaust pipe, for the purpose set forth.

4. In combination, a water tank, a pipe for supplying gas under pressure thereto, the inner end of said pipe being provided with a valve seat, a rotary valve stem provided with a valve, adapted to co-operate with said seat, a lever mounted upon said stem, a vertical bar depending from one end of said lever and provided with a shoulder, a float loosely engaging said bar and adapted to engage the said shoulder, whereby its vertical movement is limited, and whereby the valve stem is rotated by the vertical movement of said float, substantially as described.

5. In combination, a water tank, a pipe through which gas under pressure is supplied thereto, the inner end of said pipe being provided with a valve seat, a rotary valve stem having a valve adapted to co-operate with said seat, a movable weight mounted upon said stem, a shoulder moving in unison with said weight, a lug upon the said stem adapted to be engaged by said shoulder, and means for causing the movement of the said weight, for the purpose set forth.

6. In combination, a water tank, a pipe through which gas under pressure is supplied thereto, the inner end of said pipe being provided with a valve seat, a rotary valve stem having a valve adapted to co-operate with said seat, a movable weight mounted upon said stem, shoulders connected to and moving in unison with said weight, a lug upon the said stem adapted to be engaged by said shoulder, and means for causing the movement of the said weight, for the purpose set forth.

7. In combination, a water tank, a pipe through which air under pressure is supplied thereto, the inner end of said pipe being provided with a valve seat, a rotary valve stem having a valve adapted to co-operate with said seat, a movable weight mounted upon said stem, a shoulder moving in unison with said weight, a lug upon the said stem adapted to be engaged by said shoulder, and means for occasioning automatic movement of the said weight, for the purpose set forth.

8. In combination, a water tank, a pipe through which air under pressure is supplied thereto, the inner end of said pipe being provided with a valve seat, a rotary valve stem having a valve adapted to co-operate with said seat, a movable weight mounted upon said stem, shoulders connected to and moving in unison with said weight, a lug upon the said stem adapted to be engaged by said shoulder, and means for occasioning automatic movement of the said weight, for the purpose set forth.

9. In combination, a water tank, means for admitting gas under pressure thereto, means for controlling such admission, comprising a rotary valve stem, provided with a lug, a weight pivotally mounted on said stem and provided with a plurality of shoulders for engagement with the said lug, and means automatically operated to effect pivotal movement of said weight whereby the valve stem is rotated for the purpose set forth.

10. A water tank, a pipe for supplying gas under pressure thereto, a rotary valve for opening and closing said pipe, the said valve being provided with a stem having a lug thereon, a weight pivotally mounted on said stem and provided with shoulders adapted to engage said lug, and means for moving said weight from one side to the other of its line of gravitation, for the purpose set forth.

11. A water tank, a pipe for supplying gas under pressure thereto, a rotary valve for opening and closing said pipe, the said valve being provided with a stem having a lug thereon, a weight pivotally mounted on said stem and provided with shoulders adapted to engage said lug, and a lever pivotally mounted on said stem and provided with means for causing the movement of said weight, substantially as described.

12. A water tank, a pipe for supplying gas under pressure thereto, a rotary valve for opening and closing said pipe, the said valve being provided with a stem having a lug thereon, a weight pivotally mounted on said stem and provided with shoulders adapted to engage said lug, a lever pivotally mounted on said stem and provided with means for causing the movement of said weight, a gas exhaust pipe leading from said tank, and means connected to said valve for opening and closing said exhaust pipe, substantially as described.

13. A water tank, an inlet pipe for conveying water thereinto, an exit pipe for conveying water therefrom, a pipe for supplying gas under pressure thereto, a rotary valve for opening and closing said pipe, the said valve being provided with a stem having a lug thereon, a weight pivotally mounted on said stem and provided with shoulders adapted to engage said lug, a lever pivotally mounted on said stem and provided with means for causing the movement of said weight, a gas exhaust pipe leading from said tank, and means connected to said valve for opening and closing said exhaust pipe, substantially as described.

In testimony that I claim the foregoing as my invention I have hereunto signed my name this 19th day of November, A. D. 1902.

WILLIAM U. GRIFFITHS.

In presence of—
S. SALOME BROOKE,
THOS. K. LANCASTER.